Aug. 2, 1966  E. S. HANNIS  3,263,271
EXTRUSION APPARATUS

Filed March 2, 1964  3 Sheets-Sheet 1

INVENTOR
E. S. HANNIS
BY A. J. Nugent
ATTORNEY

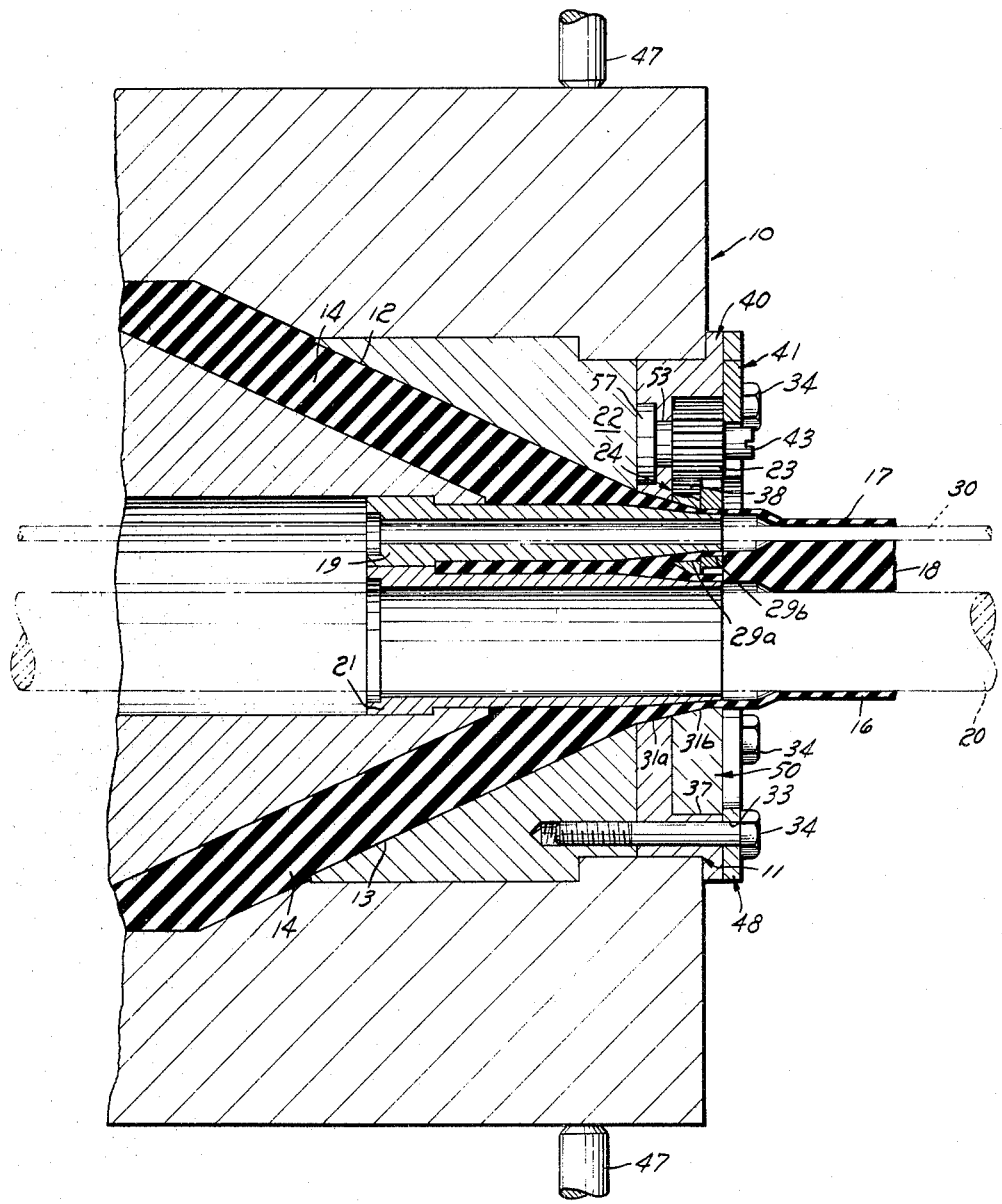

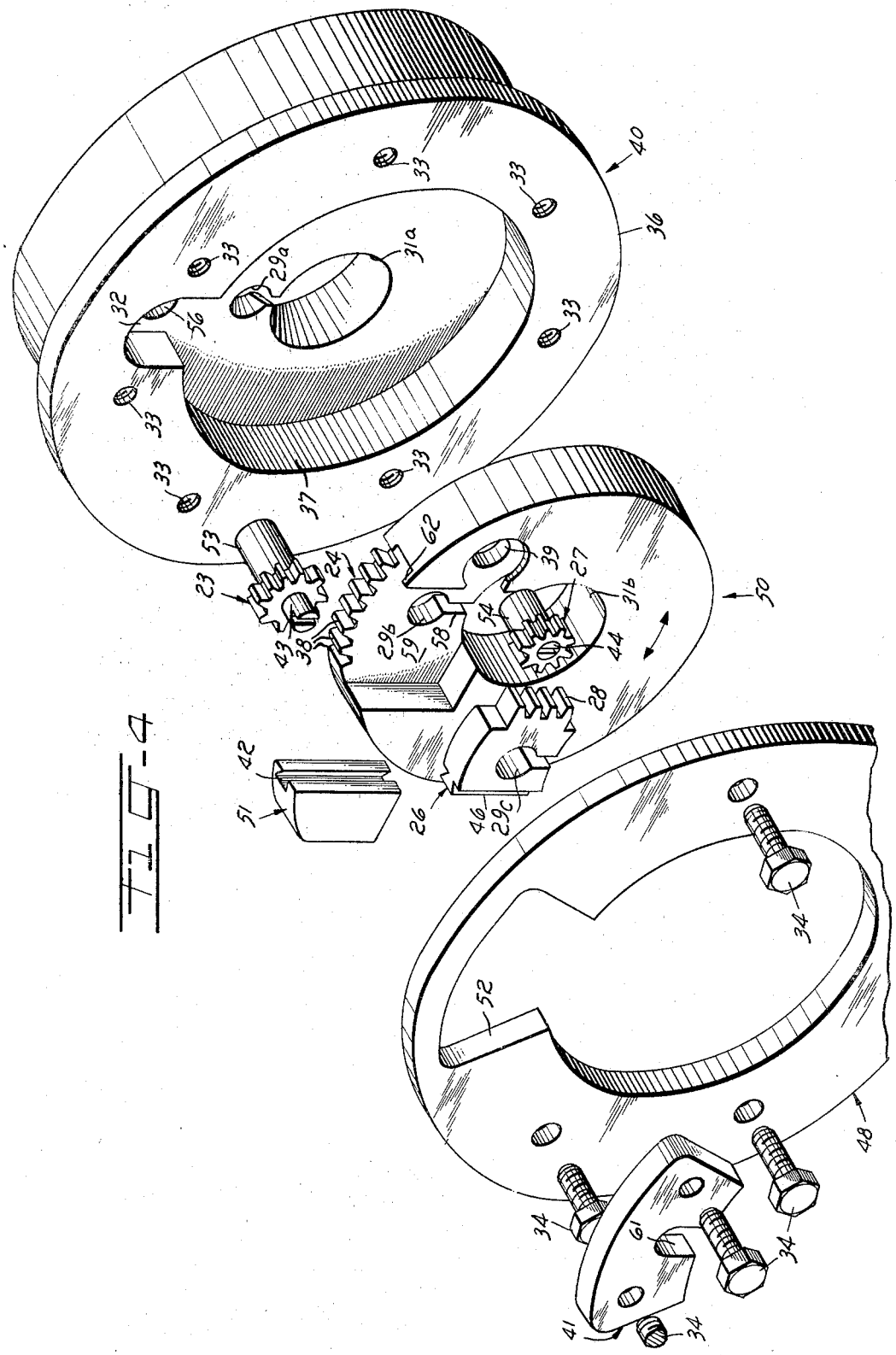

United States Patent Office 3,263,271
Patented August 2, 1966

3,263,271
EXTRUSION APPARATUS
Eugene S. Hannis, Hoboken, N.J., assignor to Western Electric Company, Incorporated, New York, N.Y., a corporation of New York
Filed Mar. 2, 1964, Ser. No. 348,359
8 Claims. (Cl. 18—13)

This invention relates to extrusion apparatus and particularly to apparatus for extruding plastic sheaths over the cable core and support wire of self-supporting cable.

In the communications field, cable of the self-supporting type in one form comprises a cable core and support wire encased in plastic insulating material, there being a web portion of insulating material joining the respective insulating sheaths of the core and the support wire. The cable core includes a plurality of conductors and is undulated to provide excess length and render the individual conductors more accessible for making terminations. The support wire may be of solid or stranded construction. A self-supporting cable of the above described type is shown in Patent 3,207,836 to H. C. Slechta.

The practice in the manufacture of self-supporting cable of simultaneously extruding the outer plastic sheaths about the cable core and the support wire together with the connecting web of material joining the sheaths presents a problem in attaining concentricity of the sheaths about their respective axes. The maintenance of concentricity is not merely a problem of mechanical construction which can be solved by accurately constructing the cable dies. One of the factors contributing to non-concentricity is the uneven flow of plastic material from the extruder screw tip to the die which results from the segmented application of plastic to the cable from a plurality of passages of varying lengths and different configurations. It has been found that compensation for variations in plastic flow can be made by adjusting the positions of the cable code die and the support wire die with respect to their core tubes to maintain the applied sheaths in a concentric relationship.

Other arrangements have been devised to permit independent adjustment of the cable core die and support wire die to eliminate eccentricity of sheath material, one such device being shown in my previously filed application Serial No. 322,178, filed November 7, 1963. These devices generally have certain drawbacks, for example, the elimination of die drool wherein the extruded plastic forms in pockets between the support wire die aperture and the core die aperture at the outlet of the extrusion apparatus presents a problem in both adjustable and split-type dies. The latter split-type die construction also tends to leave external markings on the extruded sheath in addition to causing the bubble formation or drool at the die outlet. Furthermore, most prior art devices are limited to the manufacture of small diameter cables since it is somewhat impractical to obtain relatively large corrections for sheath eccentricity with adjusting means proposed by said devices.

Accordingly, an object of this invention is to provide a new and improved adjustable die construction for self-supporting cable.

Another object of this invention is to provide a pair of dies which may be independently adjusted in horizontal and vertical planes relative to the path of a cable core and support wire through an extrusion apparatus.

A more specific object of this invention is to provide an apparatus including adjustable gear means for obtaining concentricity in the outer plastic jackets respectively surrounding the support wire and cable core of a self-supporting cable.

With these and other objects and advantages in view, the present invention contemplates a cable extrusion die for self-supporting cable of the figure-8 type permitting bidirectional independent concentricity adjustments of both the support wire die and the cable die in order to maintain a high degree of symmetry in the cross section of the cable insulation. The die comprises a die body mounted on the end of a core tube assembly and an adjustable die insert mounted in a recess within the die body. The die insert is rotatable about the cable core axis by means of a pinion gear which engages a meshing surface on the periphery of the insert. The adjustable die insert includes a wire die insert which is movable vertically by means of a second pinion gear which meshes with teeth on one edge of the insert to produce vertical displacement of the wire die aperture with respect to the cable core axis.

In operation, the cable core die which determines the symmetry of the core insulation is first positioned in vertical and horizontal planes by adjusting means connected to the extruder head. Then the first pinion gear is rotated until the support wire is concentric in a horizontal plane. If further adjustment is needed, the second pinion gear is rotated until the support wire sheath is concentric in a vertical plane resulting in a highly symmetrical self-supporting cable. The gears are then clamped in position and the extrusion apparatus is ready for operation.

Other objects and advantages will be apparent from the following detailed description when considered in conjunction with the following drawings wherein:

FIG. 3 is a cutaway side view designated to illustrate the invention; and

FIG. 4 is an exploded isometric view of the die assembly.

Figure 1:
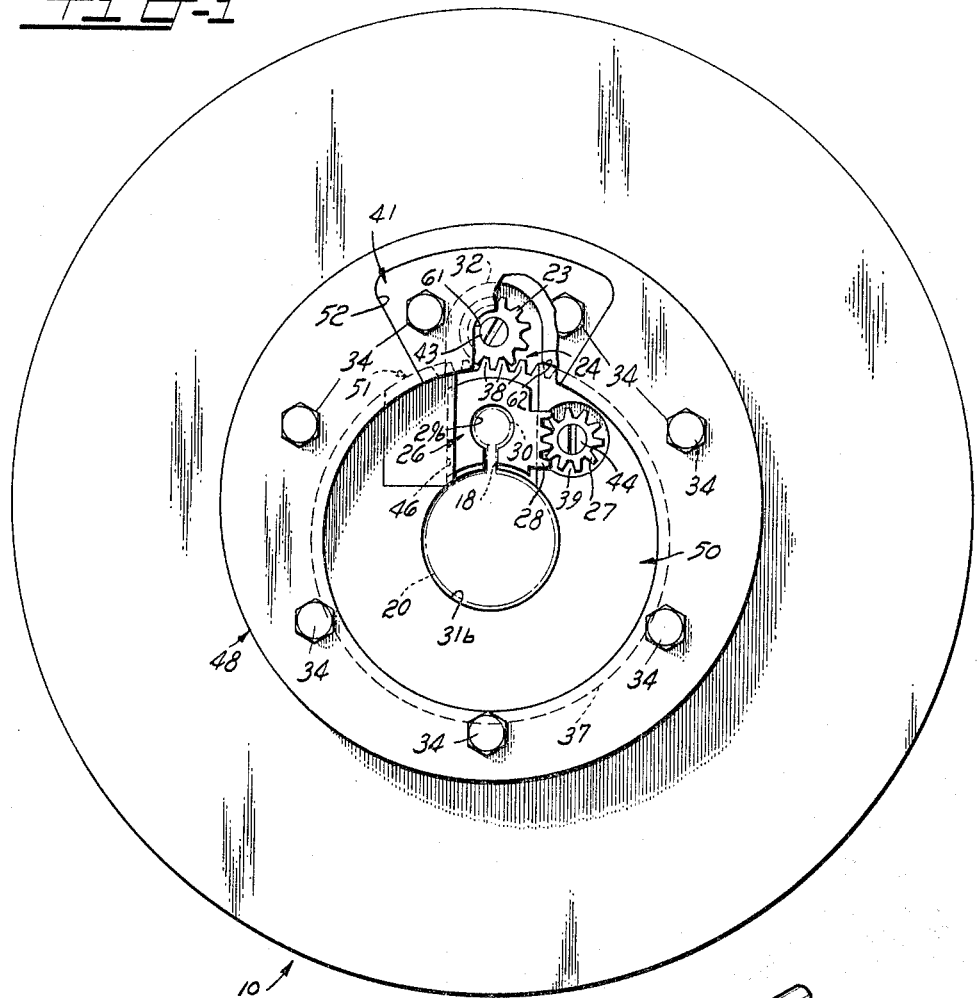
FIG. 1 is a cutaway end view of the subject extrusion die embodying the invention.
Figure 2:
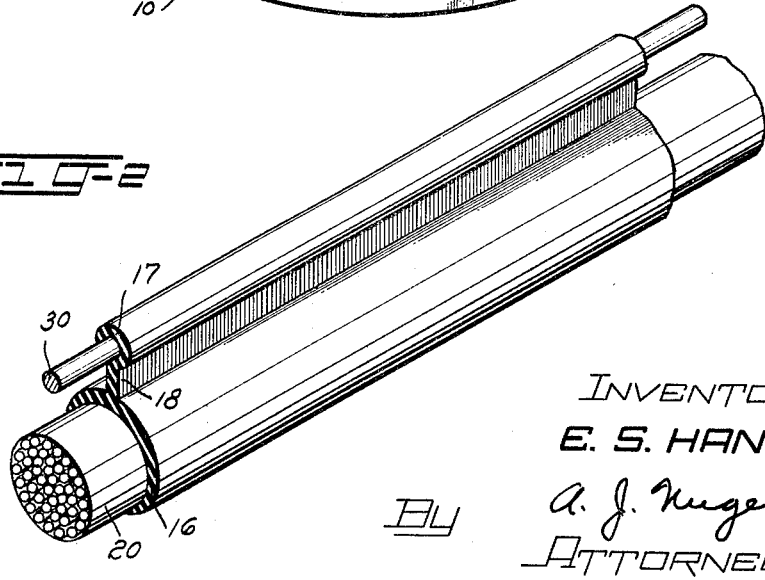
FIG. 2 is an isometric view of a typical self-supporting cable of the figure-8 type.

With reference to FIGS. 1 and 3 of the drawings, an extrusion die for self-supporting cable, particularly figure-8 type cable, comprises an extruding head or die block 10 recessed at 11 and provided with internal flow channels 12 and 13 for the passage of molten plastic 14 from an extruding screw (not shown.) The flow channels 12 and 13 direct the extruded material, such as polyethylene, about a pair of juxtaposed core tubes 19 and 21 which are mounted together and extend outwardly to the exit end 22 of the extrusion head 10 and the recess 11 therein. At the exit portion 22 of the extruder, the plastic material is guided between the external core tube walls and internal die walls to form sheaths 16 and 17 about the cable core 20 and support wire 30 and a connecting web 18 as the core 20 and wire 30 emerge from the core tubes 21 and 19.

More specifically, the invention includes a die body 40 mounted on the end of a dual core tube assembly and an adjustable die insert 50 mounted within the die body 40. As will be described later in greater detail, the die insert 50 is rotatable about the cable core axis by means of a pinion gear 23 which engages a meshing surface 24 on the periphery of the insert 50. The adjustable die insert 50 includes a wire die insert 26 which is vertically movable within a dovetail slot 42 in element 51 when gear 27 meshes with a rack portion 28 thereon to produce vertical displacement of the wire die aperture 29c with respect to the cable core axis. The relationship of the aforementioned elements may be readily established by reference to the exploded view shown in FIG. 4.

The die body 40 is generally circular in configuration and includes a pair of tapered apertures 29a and 31a located therein for passage of the extruded plastic material 14 about the core tubes 19 and 21 which guide the wire 30 and the cable core 20 respectively. The recess indicated generally at 32 permits placement of pinion gear 23 therein with the shaft 53 extending through the aperture 56 to be journaled in bearing 57. A plurality of apertures 33 are spaced about the face 36 of the die body 40 to permit assembly of the body 40 to the die block 10 by means of screws or bolts 34 which extend through retaining ring 48 and are anchored in the die block 10. The die body 40 is recessed at 37 to accommodate the die insert 50.

The die insert 50 comprises a generally circular member adapted to be placed within the recessed portion 37 of the die body 40 and includes tapered apertures 31b and 29b for the cable core sheath 16 and support wire sheath 17. The apertures 31 and 29b are mounted substantially concentric with the corresponding apertures 31a and 29a in the die body 40 and are joined by an elongated slot 58 which serves as the extrusion aperture for the web 18. The die insert 50 also includes an upper toothed portion 24 having approximately seven gear teeth 38 and a slotted portion 59 with a clearance hole 39 extending therethrough for placement of an adjusting gear 27. The gear teeth 38 are as small as practicable in order to obtain a near uniform motion. Also positioned within the slotted portion 59 are a guide element 51 and a movable rack member 26 which is held in place by the shoulder 62.

The die design as previously mentioned includes a pair of gears 23 and 27 having shafts 53 and 54 located within respective clearance apertures 56 and 39. The gears 23 and 27 are adapted for movement by manual rotation of screws 43 and 44. The first gear 23, which is mounted to shaft 53 by screw 43, meshes with the gear teeth 38 on the periphery of the die insert 50 to permit horizontal eccentricity adjustments of the wire sheath 17. The second gear 27, which is mounted to shaft 54 by screw 44, meshes with a vertical rack 28 having a dovetail portion 46 movable within slot 42 and is designed to permit vertical eccentricity adjustments and to maintain the required web height. The clamp 41 fits within a recess 52 in the retaining plate 48 and clamps the gear 23 firmly in place after an adjustment has been made.

In operation, the cable core sheath 16 is positioned in horizontal and vertical planes about the core 20 by means of horizozntal (not shown) and vertical jack screws 47 which govern the movement of the die block 10. After the necessary corrections have been made to the core sheath 16, a length of cable is run to determine the concentricity of the wire sheath 17 with respect to the core sheath 16. If the horizontal eccentricity of the wire sheath 17 requires adjustment, the clamp 41 is loosed and a screwdriver inserted into slot 61 to rotate gear 23 in the proper direction to secure a uniform support wire sheath 17. If necessary, the rack or toothed slide 26 is then displaced vertically by removing plate 48 and rotating gear 27 to secure vertical concentricity of the wire sheath or changes in the web height. After the required adjustments have been made, the screws 34 are tightened to freeze the die assembly in position. Of course, it is entirely possible to envision an embodiment wherein the clamp 41 would be shaped so as to lock gear 27 in a manner similar to gear 23 and thereby eliminate the need to remove plate 48 for vertical adjustments.

Besides producing a concentrically sheathed cable by non-concentric die adjustments, the disclosed die design possesses numerous other advantages such as permitting changes in web height for various cables and the elimination of sheath distortion which affects placement of the self-supporting cable in the field and the making of connections to the cable. In most cables, the web height which often affects the vertical concentricity of the wire sheath is approximately .080 inch±.02 inch depending on cable size, etc., so that the major eccentricity adjustment is usually in the horizontal plane. Since the die insert 50 rotates about the core axis when a horizontal eccentricity adjustment is made to the support wire sheath 17, the core sheath 16 is not disturbed and the extruder head 10 need not be readjusted by means of the jack screws 47. A concentrically sheathed self-supporting cable is therefore obtained by symmetrically positioning the core sheath 16 about the core 20 and then adjusting the extrusion aperture for the support wire sheath 17 relative to the fixed core sheath 16 until the wire sheath 17 is also concentric.

The die assembly also permits compensation for core tube wear resulting from the abrasive movement of the high tensile strength strand 30 by adjustment of the vertical slide 26. Furthermore, there is a possibility of material savings by employing a thinner sheath 17 on the wire 30 if sheath concentricity can be maintained within close tolerances since on a typical cable, the core sheath 16 is approximately .045 inch thick while the wire sheath 17 is about .060 inch thick. Because greater control of the sheathing operation is feasible with the above design, there is less tendency for the operator to slow down the speed of the cable manufacturing line relative to the screw speed to place additional sheathing material 14 about the self-supporting cable to meet specification requirements.

It is to be understood that the above-described arrangements are simple illustrative examples of the application of the principles of the invention. The use of the terms, "vertical" and "horizontal," are merely for the purpose of facilitating the description. Numerous other arrangements may be readily devised by those skilled in the art which will embody the principles of the invention and fall within the spirit and scope thereof.

What is claimed is:

1. In an apparatus for sheating self-supporting cable comprising a cable core and support wire each having an insulating sheath and being interconnected by a web of insulating material, the combination of:
   a die body mounted at the exit portion of the sheathing apparatus having a pair of spaced substantially circular apertures extending therethrough joined by a slot, the apertures being adopted to receive the cable core and support wire respectively, and an outer recessed portion,
   a rotatable die insert mounted within the recessed portion of the die body, the insert having a pair of spaced substantially circular apertures and a connecting slot, the insert apertures being in substantially concentric relationship with the corresponding apertures in the die body and the insert slot being aligned with the slot in the die body, a cutaway portion, and a toothed peripheral portion,
   a toothed rack slidably mounted within the cutaway portion of the die insert and having a substantially circular aperture positioned concentrically with reference to the support wire aperture and a slotted portion aligned with the connecting slot to regulate the vertical application of sheathing material to the wire and to control the web height,
   a first gear meshing with the rack and designed to move said rack transversely with reference to the sheath axis when sheath adjustments are desired, and
   a second gear meshing with the toothed peripheral portion of the die insert and adapted to impart rotational movement to the insert for horizontal adjustments to the wire sheath.

2. In an apparatus according to claim 1:
   a clamp plate mounted to the apparatus to hold the gears firmly in position after the required sheath adjustments have been made, and
   a retaining plate mounted to the apparatus for securing the die body and die insert thereto.

3. In an apparatus for sheathing a self-supporting cable comprising a cable core and support wire with an outer jacket of insulating material which joins the core and wire in a spaced relationship with a web portion of said material, the combination of:
   a first die including a first pair of spaced apertures joined by a slot having spaced side walls for the passage of insulating material to form the outer jacket about the core and wire being fed therethrough and to form the connecting web, a second die rotatably mounted on the first die and having a pair of apertures joined by a slot, the latter pair of apertures being positioned in substantially concentric relationship with the pair of apertures of the first die and the latter insert slot being aligned with the slot in the first die, means for rotating the second die with reference to the first die to attain concentricity of the support wire sheath in a first plane with reference to the core sheath, an apertured member slidably mounted on the second die, and means for adjusting the apertured member to control the concentricity of the support wire sheath in a second plane and to control the web height by regulating the flow of sheathing material as the cable core and support wire are advanced through the second die.

4. In an apparatus for sheathing self-supporting cable comprising a cable core and support wire each having an insulating sheath and being interconnected by a web of insulating material the combination of:

a die body mounted at the exit portion of the sheathing apparatus, said die body including an outer recessed portion having a pair of connecting apertures joined by a slot, the cable core and support wire being fed through said apertures and the die body further including a clearance hole extending therethrough, a die insert rotatably mounted within the recessed portion of the die body, said insert including a pair of apertures and a connecting slot, the insert apertures being positioned in a substantially concentric relationship with the corresponding apertures in the die body, and the insert slot being aligned with the slot in the die body, said insert further including a cutaway portion having a clearance hole extending therethrough and a toothed peripheral portion, a toothed rack mounted within the cutaway portion of the die insert, said rack having a slotted portion positioned concentrically with reference to the aperture for the support wire and the connecting slot for the web insulating material in order to regulate the application of sheathing material to the wire in a first plane and to control the web height, a first gear having a shaft mounted thereto and extending through the clearance hole in the cutaway portion of the die insert, said gear meshing with the toothed peripheral portion of the insert for making sheath concentricity adjustments in a second plane, and a second gear meshing with the toothed rack and designed to move said rack for sheath adjustments, said gear including a shaft mounted thereto and extending through the clearance hole in the die body.

5. In a apparatus according to claim 4:

a clamp plate having a slotted portion to accommodate a gear rotating element mounted to the die body to hold the second gear in a fixed position, a guide element for the rack mounted within the cutaway portion of the die insert, and a retaining plate mounted to the apparatus for securing the die body and die insert thereto and for fixedly holding the first gear in position.

6. An apparatus according to claim 4 wherein:

the pair of connecting apertures in the die body and die insert include tapered side walls for the passage of sheath insulating material, and the toothed rack includes a dovetail portion for guiding the movement of said rack.

7. In an apparatus according to claim 4:

a pair of core tubes for the support wire and cable core respectively, integrally mounted within the apparatus and extending within the die assembly through the exit portion of the apparatus, the external walls of said core tubes and the internal walls of the die body and die insert respectively defining channels for the sheathing material.

8. An apparatus for concentrically sheathing self-supporting cable which includes a cable core and support wire each having an insulating sheath and being interconnected by a connecting web comprising:

an extruder having an outlet portion for the flow of extruded sheathing material, a pair of core tubes for the cable core and support wire respectively mounted at the extruder outlet, an extrusion die positioned in a spaced relationship about the core tubes at the extruder outlet, the internal die wall and the core tube defining a passageway for the sheathing material, means for adjusting the outlet portion of the extruder to obtain a concentric cable core sheath, and means for adjusting the flow of material to obtain a concentric support wire sheath without disturbing the core sheath adjustment.

References Cited by the Examiner

UNITED STATES PATENTS

| | | | |
|---|---|---|---|
| 2,105,812 | 1/1938 | Gordon et al. | 18—13 X |
| 2,141,005 | 12/1938 | Lussie | 18—14 |
| 2,216,832 | 10/1940 | Royle | 18—14 |
| 2,574,555 | 11/1951 | Galloway | 18—14 |
| 2,788,543 | 4/1957 | Dinsch | 18—12 X |
| 2,956,311 | 10/1960 | Raydt et al. | 174—41 X |
| 2,978,748 | 4/1961 | McCauley et al. | 18—12 X |
| 3,074,107 | 1/1963 | Kiyoski Mase et al. | 174—117 X |

WILLIAM J. STEPHENSON, *Primary Examiner.*